Aug. 9, 1938.  F. B. FILLO  2,126,182
AIR CONDITIONING SYSTEM
Filed Sept. 5, 1935  2 Sheets-Sheet 2

Fig. 2

Inventor
Francis B. Fillo
By George H. Fisher
Attorney

Patented Aug. 9, 1938

2,126,182

UNITED STATES PATENT OFFICE 2,126,182

AIR CONDITIONING SYSTEM

Francis B. Fillo, St. Louis, Mo., assignor to Minneapolis-Honeywell Regulator Company, Minneapolis, Minn., a corporation of Delaware Application September 5, 1935, Serial No. 39,277

2 Claims. (Cl. 236—44)

This invention relates to air conditioning systems.

An object of this invention is to provide an air conditioning system for maintaining the relative humidity of a space constant and for maintaining the temperature of a space constant when used for either summer cooling or winter heating.

Another object of this invention is to provide an air conditioning system wherein an air conditioning unit, having humidifying means and temperature changing means, conditions the air delivered to a space, and wherein the space is provided with humidity responsive means and temperature responsive means for controlling the humidifying means and the temperature changing means to maintain the temperature and relative humidity of the space constant.

More specifically, it is an object of this invention to provide an air conditioning system of the type described wherein the thermostatic means operates the temperature changing means to supply heat to the space when the space temperature decreases, and to abstract heat when the space temperature increases, and wherein the humidity responsive device operates the humidifying means when the space relative humidity decreases and operates the temperature changing means when the relative humidity increases.

Still another object of this invention is to provide an air conditioning system of the class described, wherein the space thermostat operates a heating means when the space temperature decreases and operates a cooling means when the space temperature increases, and wherein the space humidostat operates a humidifying means when the relative humidity decreases and operates the cooling means when the relative humidity increases.

Still another object of this invention is to provide an air conditioning system of the class described, wherein the space thermostat operates a heating means when the space temperature decreases and operates a cooling means when the space temperature increases, and wherein the space humidostat operates a humidifying means when the relative humidity decreases and operates a heating means when the space relative humidity increases.

A further object of this invention is to provide a de-humidifying means for a space comprising cooling means, heating means, a humidostat responsive to increases in relative humidity to cause operation of the cooling means to cool the air delivered to the space and thereby condense out the water vapor in that air, and a thermostat responsive to a decreased space temperature caused by the admission of the cooled air for operating the heating means to re-heat the cooled air, whereby heated dry air is admitted to the space to decrease the relative humidity in the space.

Still another object of this invention is to provide a de-humidifying means for a space comprising cooling means and heating means, a humidostat for placing the heating means in operation when the space relative humidity is high to deliver heated air to the space, and a thermostat responsive to an increase in space temperature caused by the delivery of this heated air to place the cooling means in operation, whereby the air is cooled and the water vapor therein condensed out to deliver heated dry air to the space to reduce the relative humidity therein.

Other objects and advantages will become apparent to those skilled in the art upon reference to the accompanying specification, claims and drawings, in which drawings:

Figure 2 is a diagrammatic showing of another form of my invention.

Figure 1:
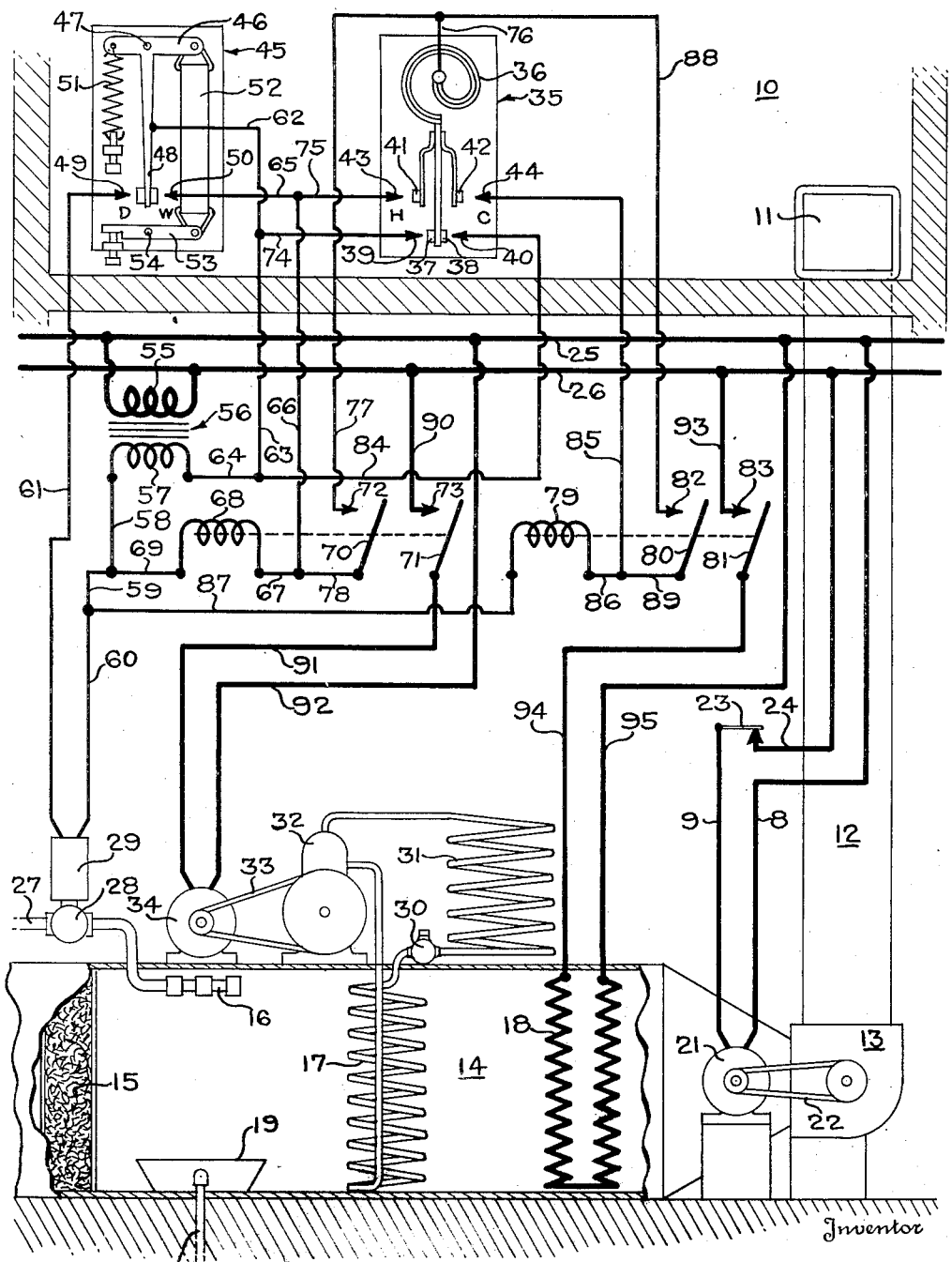
Figure 1 is a diagrammatic showing of one form of my invention.

My air conditioning system is shown as applied to a space or room 10, the air of which is to be conditioned. Conditioned air is supplied to the room or space 10 through a grill 11 by a conduit or duct 12. A fan 13 forces the conditioned air into the duct or conduit 12 from an air conditioning unit generally designated at 14. The air conditioning unit 14 is shown to comprise an air cleaner or purifier 15, of usual design, a humidifying spray 16, a set of cooling coils 17, and heating elements which may take the form of electric heating coils 18. Located at the bottom of the conductor 14 is a drain pan 19 to collect the excess of water delivered by the humidifying spray 16 and to allow drainage of the same from the conditioning unit 14 through a pipe 20.

The fan 13 is driven by an electric motor 21 through any suitable means such as a belt 22. The motor 21 is connected by a wire 8 and by a wire 9, a switch 23 and a wire 24 to line wires 25 and 26 leading from some source of power, not shown. The switch 23 may be manually operated and when closed a circuit is completed from the line wire 26, through wire 24, switch 23, wire 9, electric motor 21 and wire 8 back to the other line wire 26 to cause operation of the motor 21 and the fan 13 to deliver air from the conditioning unit 14 into the space or room 10, to be conditioned.

Water is supplied for humidifying purposes to the humidifying spray 16 through a pipe 27 emanating from some source of water, not shown. A valve 28 is located in the pipe 27 to control the flow of water to the humidifying spray 16, the valve 28 being in turn controlled by a solenoid 29. The arrangement is such that when the solenoid 29 is energized the valve 28 is opened to cause operation of the humidifying spray 16, and when the solenoid 29 is de-energized the valve 28 is closed to prevent the further operation of the spray 16.

Cooling coil 17 may form a portion of a mechanical refrigerating mechanism which may comprise an expansion valve 30, a condenser 31 and a compressor 32, all of which is well known in the art. The compressor 32 may be operated by an electric motor 34 through any connecting means such as a belt 33. Upon energization of the electric motor 34 the compressor 32 is placed in operation to cause cooling of the cooling coil 17 to cool the air passing through the air conditioning unit 14. Upon de-energization of the electric motor 34 further cooling of the air in the air conditioning unit 14 is prevented.

Located in the room or space 10 to be conditioned is a thermostat generally designated at 35. The thermostat may comprise a bimetallic element 36 which carries contacts 37 and 38 adapted to engage spaced contacts 39 and 40. The bimetallic element 36 also carries contacts 41 and 42 which are adapted to engage spaced contacts 43 and 44, respectively. The distance between contacts 37 and 39, and 38 and 40, is less than the distance between contacts 41 and 43, and 42 and 44. Therefore, upon an increase in temperature affecting the bimetallic element 36, the contact 37 is first moved in the direction designated by the character H into engagement with contact 39, and then upon a further slight increase in temperature the contact 41 is moved into engagement with the contact 43. Likewise, upon a decrease in temperature the contact 38 is moved in the direction of the character C into engagement with the contact 40 and upon a further slight decrease in temperature the contact 42 is moved into engagement with the contact 44.

Also located in the space or room 10 to be conditioned is a humidity responsive switching mechanism 45 termed herein as a humidostat. The humidostat 45 comprises a lever 46 pivoted at 47 and carrying a switch arm 48, which is adapted to engage spaced contacts 49 and 50. The lever 46 is urged in a counter-clockwise direction by an adjustable tension spring 51. Connected to the lever 46 is a humidity responsive element 52 which may take the form of hair, which in turn is secured to an adjustable lever 53 pivoted at 54. Upon a decrease in relative humidity the humidity responsive element 52 contracts and acts against the tension of the spring 51 to move the switch arm 48 in the direction indicated by the character D into engagement with the contact 49. Upon an increase in relative humidity the humidity responsive element 52 expands to allow the spring 51 to move the switch arm 48 in the direction indicated by the character W into engagement with the contact 50. By reason of the adjustable tension spring 51, and the adjustable lever 53, the values of the relative humidity which will cause movement of the switch arm 48 into engagement with the contacts 49 and 50 may be adjusted.

Connected across the line wires 25 and 26 is a primary 55 of a step-down transformer 56, having a secondary 57. One end of the secondary 57 is connected by wires 58, 59 and 60 to the solenoid 29 of the valve 28, and the solenoid 29 is in turn connected by a wire 61 to the contact 49 of the humidostat 45. The switch arm 48 is connected by wires 62, 63 and 64 to the other end of the secondary 57. Therefore, when the relative humidity in the space or room 10 decreases to a predetermined value so as to move the switch arm 48 into engagement with the contact 49, a circuit is completed from the secondary 57, through wires 58, 59 and 60, solenoid 29, wire 61, contact 49, switch arm 48, and wires 62, 63 and 64 back to the secondary 57. Completion of this circuit causes energization of the solenoid 29 to open the valve 28 to spray water into the conditioning unit 14 to restore the relative humidity of the space 10 to the normal value. When the relative humidity of the space 10 has been restored to the normal value the switch arm 48 is moved out of engagement with the contact 49 to cause de-energization of the solenoid 29 and prevent the further supply of moisture to the air passing through the conditioning unit 14.

The other contact 50 of the humidostat 45 is connected by wires 65, 66 and 67 to one end of a relay coil 68 and the other end of the relay coil 68 is connected by a wire 69 to the junction of wires 58 and 59. Therefore, when the relative humidity of the space or room 10 increases above a predetermined value so as to move the switch arm 48 into engagement with the contact 50, a circuit is completed from the secondary 57, through wires 64, 63 and 62, switch arm 48, contact 50, wires 65, 66 and 67, relay coil 68, and wires 69, and 58 back to the secondary 57. This causes energization of the relay coil 68 to move switch arms 70 and 71 into engagement with contacts 72 and 73. When the relative humidity of the space 10 decreases to a normal value, the switch arm 48 moves out of engagement with the contact 50 to break the circuit through the relay coil 68 to cause de-energization of the same to cause movement of the switch arms 70 and 71 out of engagement with the contacts 72 and 73. This movement of the switch arms 70 and 71 may be caused by springs, gravity or other means, not shown.

The contact 39 of the thermostat 35 is connected by a wire 74 to the junction of wires 62 and 63 and the contact 43 is connected by a wire 75 to the junction of wires 65 and 66. The bimetallic element 36 of the thermostat 35 is connected by wires 76 and 77 to the contact 72 and the switch arm 70 associated with the contact 72 is connected by a wire 78 to the junction of wires 66 and 67. When the room temperature increases above a predetermined value the contact 37 is moved into engagement with the contact 39 and upon a further slight increase in space temperature the contact 41 is moved into engagement with the contact 43. This causes completion of a circuit from the secondary 57 through wires 64, 63 and 74, contacts 39, 37, 41 and 43, wires 75, 66 and 67, relay coil 68 and wires 69 and 58 back to the secondary 57. This causes energization of the relay coil 68 to move the switch arms 70 and 71 into engagement with the contacts 72 and 73. Movement of the switch arm 70 into engagement with the contact 72 completes a maintaining circuit from the secondary 57 through wires 64, 63 and 74, contacts 39 and 37, bimetallic element 36, wires 76 and 77, contact 72, switch arm 70, wires 78 and 67, relay coil 68 and wires 69 and 58 back to the secondary 57. This maintaining circuit maintains the relay coil 68 energized until the space temperature drops sufficiently far to break contact between the contacts 37 and 39, at which time the switch arms 70 and 71 are moved out of engagement with the contacts 72 and 73.

This invention also contemplates the use of a relay coil 79 for operating switch arms 80 and 81. When the relay coil 79 is energized the switch arms 80 and 81 are moved into engagement with contacts 82 and 83, and when the relay coil 79 is de-energized the switch arms 80 and 81 are moved out of engagement with their respective contacts by means of springs, gravity or other means, not shown. One end of the secondary 57 is connected by the wire 64 and a wire 84 to the contact 40 of the space thermostat 35. The other contact 44 is connected by wires 85 and 86 to one end of the relay coil 79. The other end of the relay coil 79 is connected by wires 87, 59 and 58 to the other end of the secondary 57. The contact 82 is connected by a wire 88 and the wire 76 to the bimetallic element 36 and the switch arm 80 associated with the contact 82 is connected by a wire 89 to the junction of wires 85 and 86.

Upon a decrease in space temperature below a predetermined value the contact 38 is moved into engagement with the contact 40 and upon a further slight decrease in space temperature the contact 42 is moved into engagement with the contact 44. This causes completion of a circuit from the secondary 57 through wires 64 and 84, contacts 40, 38, 42 and 44, wires 85 and 86, relay coil 79 and wires 87, 59 and 58, back to the secondary 57. Completion of this circuit causes energization of the relay coil 79 to move the switch arms 80 and 81 into engagement with the contacts 82 and 83. Movement of the switch arm 80 into engagement with the contact 82 completes a maintaining circuit from the secondary 57 through wires 64 and 84, contacts 40 and 38, bimetallic element 36, wires 76 and 88, contact 82, switch arm 80, wires 89 and 86, relay coil 79, and wires 87, 59 and 58, back to the secondary 57. Completion of this circuit maintains the relay coil 79 energized until the space temperature increases to a value which is sufficient to break contact between the contacts 38 and 40, at which time the relay coil 79 is de-energized to move the switch arms 80 and 81 out of engagement with contacts 82 and 83.

The contact 73 is connected by a wire 90 to the line wire 26, and the switch arm 71 associated with the contact 73 is connected by a wire 91 to the electric motor 34 operating the compressor 32. The motor 34 is in turn connected by a wire 92 to the line wire 25. Therefore, when the relay coil 68 is energized in the manner pointed out above, a circuit is completed from the line wire 26, through the wire 90, contact 73, switch arm 71, wire 91, electric motor 34 and wire 92, back to the other line wire 25, to cause operation of the compressor 32 of the mechanical refrigerating mechanism to abstract heat from the air passing through the air conditioning unit 14.

The contact 83 is connected by a wire 93 to the line wire 26. The switch arm 81, associated with the contact 83 is connected by a wire 94 to the electric heating elements 18. The electric heating elements 18 are in turn connected by a wire 95 to the other line wire 25. Therefore, when the relay coil 79 is energized in the manner pointed out above, a circuit is completed from the line wire 26 through wire 93, contact 83, switch arm 81, wire 94, electric heating elements 18 and wire 95, back to the other line wire 25, to cause energization of the heating elements 18 to impart heat to the air passing through the air conditioning unit 14.

With the parts in the position shown in Figure 1 the relative humidity of the space 10 is normal and the temperature within the space 10 is normal. Therefore, the switch arms of the humidostat 45 and the thermostat 35 are in a mid position and the relay coils 68 and 79 are de-energized whereby the humidifying spray 16 is inoperative, the mechanical refrigerating mechanism is inoperative and the electric heating elements are inoperative. Upon a decrease in room or space temperature the relay coil 79 is energized to cause operation of the electric heating elements 18 to impart heat to the air being delivered to the space 10 to restore the temperature within the space 10 to normal. When the temperature has thus been restored to normal, the relay coil 79 is de-energized to move the switch arms 80 and 81 away from the contacts 82 and 83 to prevent the further supply of heat to the air being delivered to the space 10. When the temperature of the space 10 increases above a given value the relay coil 68 is energized to cause operation of the mechanical refrigerating mechanism to abstract heat from the air delivered to the space 10 to cool the same. When the temperature of the space 10 decreases to the normal value relay coil 68 is de-energized moving arms 70 and 71 to open contacts 72 and 73 to stop operation of the mechanical refrigerating mechanism to prevent the further delivery of cold air to the space 10. When the relative humidity of the space 10 decreases below a predetermined value, solenoid 29 is energized to operate the humidifying spray 16 to impart moisture to the air being delivered to the space 10, and when the relative humidity of the space 10 increases back to normal the solenoid 29 is de-energized to prevent further imparting of moisture to the air being delivered to the space or room. When the relative humidity in the space 10 increases above a predetermined value the relay coil 68 is energized to cause operation of the mechanical refrigerating mechanism. This causes cooling of the air passing through the air conditioning unit 14 to condense out moisture or water vapor in the air passing through the air conditioning unit 14. This cooled air carrying less water vapor is delivered to the space 10 and when the space temperature decreases to a predetermined value the relay coil 79 is energized to cause operation of the heating coils 18 to re-heat the air after it has been cooled by the cooling coil 17. In this manner when the relative humidity of the space or room 10 is too high the air delivered to the room is cooled to abstract moisture or water vapor therefrom and the air is then supplied with heat by the heating coils 18 to maintain the space temperature at the desired value. When the relative humidity in the space 10 is restored to the normal value in this manner, the relay coil 68 is de-energized to prevent further operation of the mechanical refrigerating mechanism to prevent the further abstracting of moisture from the air passing through the air conditioning unit 14, and when the space temperature again becomes normal relay coil 79 is de-energized to prevent the further imparting of heat to the air passing through the air conditioning unit 14.

From the above it is seen that I have provided an air conditioning system wherein the temperature of a space is maintained at a desired normal value and wherein the relative humidity of the space is also maintained at a desired normal value, which system may be used for either summer cooling or winter heating.

Referring now to Figure 2, like elements and connecting wires have been used throughout, and like reference characters referring to these elements and connections have been applied in Figure 2. Figure 2 differs from Figure 1 in that the bimetallic element 36 of the space thermostat 35 is reversed so that when the space temperature increases above a predetermined value the contacts 38 and 42 are sequentially moved into engagement with the contacts 40 and 44 to cause energization of the relay coil 79, and when the space temperature decreases to a predetermined value the contacts 37 and 41 are moved sequentially into engagement with the contacts 38 and 43 to cause operation of the relay coil 68. Also, the wires 91 and 92 controlled by the switch arm 71 lead to the electric heating elements 18 in Figure 2 instead of to the electric motor 34 of the mechanical refrigerating mechanism as in Figure 1. Likewise, the wires 94 and 95 controlled by the switch arm 81 lead to the electric motor 34 of the mechanical refrigerating mechanism instead of to the electric heating elements 18 as in Figure 1.

Therefore, in Figure 2 when the space temperature decreases below a predetermined value the relay coil 68 is energized to cause operation of the heating element 18 to restore the temperature of the space 10 to normal. Likewise, when the space temperature increases above a predetermined value the relay coil 79 is energized to cause operation of the mechanical refrigerating mechanism to restore the temperature of the space 10 to normal. In Figure 2, as in Figure 1, a decrease in relative humidity below a predetermined value causes energization of the solenoid 29 to cause operation of the humidifying spray 16 to impart water vapor to the air passing through the air conditioning unit 14 to restore the relative humidity of the space 10 to normal. However, in Figure 2 an increase in relative humidity causes operation of the heating elements 18 instead of the mechanical refrigerating mechanism as in Figure 1. Operation of the heating elements 18 in this manner increases the temperature of the space 10 to move the contacts 38 and 42 into engagement with the contacts 40 and 44. This causes energization of the relay coil 79 to cause operation of the mechanical refrigerating mechanism. Operation of the mechanical refrigerating mechanism in this manner decreases the temperature of the air passing through the air conditioning unit 14 to condense out water vapor or moisture in the air and then this drier air is re-heated by the electric heating coils 18 to deliver warm dry air to the space 10 to restore the relative humidity of the space 10 to normal. When the relative humidity of the space 10 has been so restored to normal the relay coil 68 is de-energized to prevent the further application of heat to the air passing through the air conditioning unit 14 and when the temperature of the space 10 decreases to a predetermined normal value the relay coil 79 is de-energized to prevent further operation of the mechanical refrigerating mechanism.

In both modifications of my invention I have provided means whereby the temperature of a space or room may be maintained constant and whereby the relative humidity of the space or room may also be maintained constant. In the showing set forth in Figure 1 an increase in relative humidity in the space 10 causes operation of the mechanical refrigerating mechanism directly to first decrease the temperature of the air being delivered to the space 10 and the air so delivered is then re-heated under the command of the space thermostat. In Figure 2 an increase in relative humidity in the space 10 causes operation of the heating coils 18 to increase the temperature of the air being delivered to the space 10 and then the mechanical refrigerating mechanism is placed in operation under the control of the room thermostat to decrease the temperature of the air being delivered to the space 10. In both instances, however, an effective control has been provided to prevent the existence of a relative humidity greater than a predetermined value.

Although I have disclosed two forms of my invention for purposes of illustration, other forms thereof may become apparent to those skilled in the art, and, consequently, this invention is to be limited only by the scope of the appended claims and the prior art.

I claim as my invention:

1. In a control system for a space air conditioning apparatus having humidifying means, cooling means and heating means, the combination of, means responsive to space temperature, means connecting at all times the space temperature responsive means with the heating means and the cooling means to cause heating when the space temperature decreases and cooling when the space temperature increases, means responsive to space relative humidity, and means connecting at all times the space relative humidity responsive means with the humidifying means and the heating means to cause humidifying when the space relative humidity decreases and heating when the space relative humidity increases.

2. In an electrical control system for a space air conditioning apparatus having electrically controlled humidifying means, cooling means and heating means, the combination of, electrical current controlling means operated in response to variations in space temperature, electrical connections connecting at all times the electrical current controlling means with the electrically controlled heating means and cooling means to cause heating when the space temperature decreases and cooling when the space temperature increases, electrical current controlling means operated in response to variations in space relative humidity, and electrical connections connecting at all times the last mentioned electrical current controlling means with the electrically controlled humidifying means and heating means to cause humidifying when the space relative humidity decreases and heating when the space relative humidity increases.

FRANCIS B. FILLO.